United States Patent [19]

Garot et al.

[11] Patent Number: 5,333,462
[45] Date of Patent: Aug. 2, 1994

[54] PROCESS AND APPARATUS FOR THE PURIFICATION OF HYDROGEN BY CRYOGENIC TREATMENT OF A GAS CONTAINING THE SAME

[75] Inventors: Corinne Garot, Chennevieres sur Marne; Pierre Gauthier, Fresnes, both of France

[73] Assignee: L'Air Liquide, Societe Anonyme pour l'etude et l'Exploitation des Procedes Georges Claude, Paris, France

[21] Appl. No.: 998,906

[22] Filed: Dec. 30, 1992

[30] Foreign Application Priority Data

Jan. 9, 1992 [FR] France .................. 92 00150

[51] Int. Cl.[5] ................................ F25J 3/02
[52] U.S. Cl. ............................. 62/24; 62/20
[58] Field of Search ................. 62/23, 20, 24

[56] References Cited

U.S. PATENT DOCUMENTS

| | | | |
|---|---|---|---|
| 2,315,424 | 3/1943 | Hill et al. | 62/31 |
| 2,975,605 | 3/1961 | Haringhuizen | 62/26 |
| 3,408,792 | 11/1968 | McHarg | 55/43 |
| 3,691,779 | 9/1972 | Meisler et al. | 62/23 |
| 4,336,045 | 6/1982 | Fisher et al. | 62/17 |
| 4,482,369 | 11/1984 | Carson et al. | 62/23 |

FOREIGN PATENT DOCUMENTS 0148070  7/1985  European Pat. Off. .

OTHER PUBLICATIONS

"$NO_x$ in the Cryogenic Hydrogen Recovery Section of an Olefins Production Unit", *Plant/Operations Progress*, vol. 5, No. 4, Oct. 1986, pp. 232–237 by W. H. Henstock.

*Primary Examiner*—Ronald C. Capossela
*Attorney, Agent, or Firm*—Young & Thompson

[57] ABSTRACT

Process and apparatus for the purification of hydrogen by cryogenic treatment of a gas containing also nitrogen oxides and unsaturated hydrocarbons as two types of constituents which react together in an undesirable fashion when cooling achieves an intermediate temperature higher than the low temperature of the treatment. The process comprises cooling the gas to a first temperature higher than that intermediate temperature; eliminating from the gas one of the two types of constituents at this first temperature; and continuing the cooling of the gas to the low temperature. The elimination of one type of component is effected by washing the gas with a liquid adapted to dissolve it. This liquid contains at least one saturated hydrocarbon and is obtained by a partial condensation of an auxiliary gas which contains at least one of hydrogen and a heavy constituent whose value can be increased. The gas treated can be a residual gas from catalytic cracking in a fluidized bed (FCC), and the auxiliary gas can be a hydrotreatment purge gas.

7 Claims, 1 Drawing Sheet

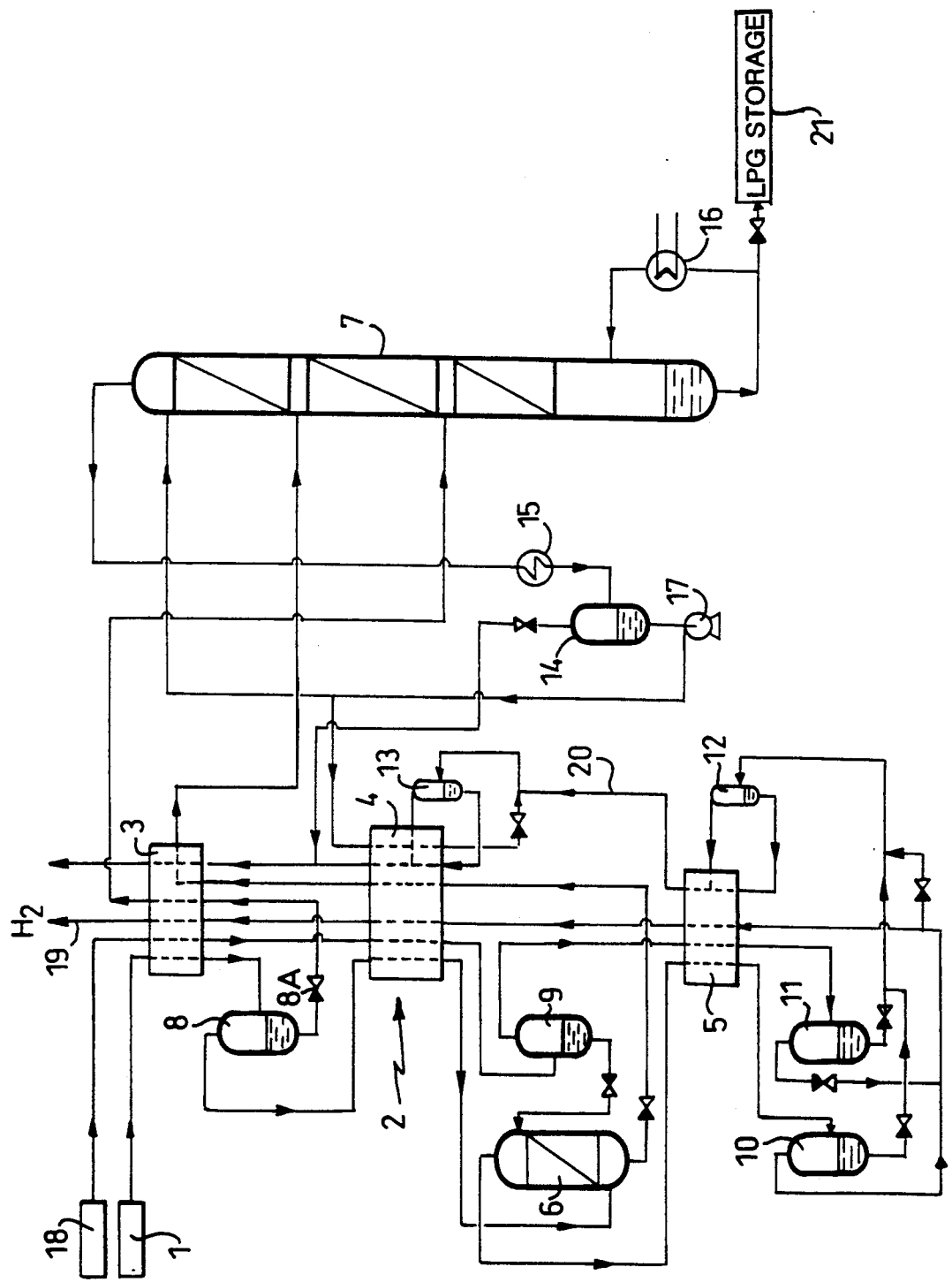

PROCESS AND APPARATUS FOR THE PURIFICATION OF HYDROGEN BY CRYOGENIC TREATMENT OF A GAS CONTAINING THE SAME

The present invention relates to a process for the purification of hydrogen by the cryogenic treatment of a gas containing also two types of constituents, namely nitrogen oxides $NO_x$ and unsaturated hydrocarbons, which react together in an undesirable way upon cooling to an intermediate temperature higher than the low temperature of the treatment. It is applicable in particular to the production of hydrogen from a gas containing, in addition to hydrogen and liquid petroleum gas (LPG) that are eventually recovered, nitrogen, methane, ethane, unsaturated hydrocarbons and nitrogen oxides $NO_x$ particularly a residual gas from catalytic cracking in a fluidized bed (Fluid Catalytic Cracking, or FCC).

The simultaneous presence of nitrogen oxides ($NO_x$) and unsaturated hydrocarbons (olefins, dienes, actylenes, . . . ) in gases such as the gas from FCC render dangerous the treatment of these fluids in cryogenic units when it is desired to work at a temperature lower than $-100°$ C.

Thus, the $NO_x$'s form at low temperature, in the presence of unsaturated hydrocarbons, nitrous gums which accumulate at different points in the heat exchange of the installation and give rise to the danger of explosion during reheating of this installation.

The invention has for its object to provide a process reliably avoiding the formation of undesirable constituents, particularly nitrous gums in the use mentioned above, in the installation.

To this end, the process according to the invention is characterized in that:

the gas is cooled to a first temperature higher than said intermediate temperature;

one of the two types of constituents is eliminated from the gas at this first temperature; and the cooling of the gas proceeds to the low temperature.

According to other characteristics:

said elimination is effected by washing the gas with a liquid adapted to dissolve one of the two types of constituents;

said liquid contains at least one saturated hydrocarbon;

the washing liquid is obtained by partial condensation of an auxiliary gas which contains hydrogen and/or at least one heavy constituent that can be increased in value;

the treated gas is a residual gas from catalytic cracking in a fluidized bed (FCC) and the auxiliary gas is a hydrotreating purge gas.

The invention also has for its object an apparatus adapted to practice the process defined above.

Generally speaking, this apparatus is characterized in that it comprises:

means to cool the gas to a first temperature higher than said intermediate temperature;

means to eliminate from the gas one of the two types of constituents at this first temperature; and means to continue the cooling of the gas to said low temperature.

In its specific application mentioned above, the apparatus is characterized in that it comprises:

means to cool the gas, if desired with intermediate separation of the heaviest constituents, to an intermediate temperature higher than $-100°$ C.;

means to cool to said intermediate temperature an auxiliary gas containing hydrogen and constituents of LPG but stripped of unsaturated hydrocarbons, so as to obtain a condensate and a vapor phase;

a column for washing with the condensate of the treated gas;

means to continue the cooling of the vapor from the head of the washing column; and a demethanization-deethanization column fed by the liquid from the base of the washing column and if desired by the condensate of said intermediate separation, this column producing LPG at its bottom.

An example of operation according to the invention will now be described with regard to the accompanying drawing, whose single FIGURE shows schematically an apparatus according to the invention.

The numerical data indicated below by way of example are approximate, and the pressures are absolute pressures.

There is shown in the drawing an apparatus adapted to produce a liquified petroleum gas (LPG) comprised by a mixture of C3, C4 and C5 saturated hydrocarbons, and hydrogen from a residual gas of the FCC process constituting a source 1, which is part of a petroleum refinery. This residual gas typically has a composition approximately 10% $H_2$, 7% $N_2$, 40% $CH_4$, 43% $C^+_2$ hydrocarbons containing unsaturated hydrocarbons, and contains as impurities nitrogen oxides $NO_x$.

Thus, the treated gas contains both $NO_x$ and unsaturated hydrocarbons, while the treatment comprises a cryogenic portion falling to a low temperature substantially lower than $-100°$ C., namely about $-160°$ C., while these constituents form together dangerous nitrous gums from about $-100°$ C.

The apparatus comprises essentially a heat exchange line 2, constituted by three successive heat exchangers, namely, a warm exchanger 3, an intermediate exchanger 4 and a cold exchanger 5, a washing column 6, a demethanization-deethanization column 7, and liquid/vapor phase separators 8-14, as well as the usual accessories among which are shown only expansion valves, a refrigeration unit 15 serving as a condenser for the head of column 7, a reboiler 16 for the bottoms liquid of this column 7, and a pump 17.

The gas to be treated, emitted from the source 1, is cooled at 20-25 bars and partially condensed in the exchanger 3. The heaviest constituents, which are $C^+_6$ hydrocarbons, are collected in the phase separator 8, expanded by about 2 bars in a valve 8A which is a Joule-Thomson valve serving to regulate the flow, reheated in the exchanger 3 and introduced at a first intermediate level in the column 7. The vapor phase continues its cooling to $-90°$ C. in the exchanger 4, then is introduced into the bottom of the column 6.

An auxiliary gas stripped of unsaturated hydrocarbons and containing hydrogen and $C_3$-$C_5$ hydrocarbons, which is in this example a residual gas from a hydrotreatment process constituting an auxiliary source 18 forming part of the same refinery, having typically as its composition 40% $H_2$, 5% $N_2$, 26% $CH_4$, 20% $C_2H_6$, 7% $C_2H_6$, 7% $C_3H_8$ and the rest constituted by $C_4$ and $C_5$ saturated hydrocarbons, is cooled at 40 bars in the exchangers 3 and 4 to $-90°$ C., a temperature at which it is partially condensed. The condensate, collected in the separator 9, is, after expansion, introduced into the head of the column 6, such that in this column, the unsaturated hydrocarbons and also part of the $NO_x$ of the treated gas, are eliminated from this latter by washing.

The liquid in the base of the column 6 is, after expansion by 2 bars and reheating in the same exchangers 4 and 3, introduced at a second intermediate level in the column 7, above the first intermediate level recited above.

The gas at the head of column 6 has an unsaturated hydrocarbon content of the order of ppb, immeasurably small. This gas and the vapor phase from separator 9, also stripped of unsaturated hydrocarbons, are cooled to the low temperature of the process, at which the other constituents than hydrogen are condensed and collected respectively in the separators 10 and 11.

The vapor phase from separator 10, combined with that from separator 11, expanded to the same pressure, is essentially reheated through all the heat exchange line 2 and provides via a conduit 19 the hydrogen product of the installation, at a pressure slightly less than that of the initial gas.

The condensates from the separators 10 and 11 are expanded to 5 bars, combined, added to a flow of hydrogen expanded to the same pressure to regulate the bubbling temperature, and sent to the separator 12. The two phases from this separator are reheated in the exchanger 5, then transmitted via a conduit 20 which opens into the separator 13.

The column 7, which functions at 18-23 bars, has a bottoms temperature of +75° C. and a head temperature of −20° C. It produces at the bottom LPG, which is, after expansion to the utilization pressure, sent to storage 21, and at the head a residual gas which, after cooling in 15, is separated into two phases in the separator 14.

The liquid phase from separator 14 is in part sent as reflux to the head of column 7 by the pump 17, and in part subcooled in the exchanger 4, expanded to 5 bars and introduced into the conduit 20. The two phases separated in the separator 13 are reheated in the exchanger 4, then there is added the vapor phase from the separator 14, expanded to the same pressure, and the whole is reheated through the exchanger 3.

Thanks to the use of the auxiliary gas stripped of unsaturated hydrocarbons and, in this example, available at the same site, there can be effectuated without danger the cryogenic treatment to the lowest desired temperature, and there are recovered at the same time the useful products (hydrogen and LPG) from the auxiliary gas.

What is claimed is:

1. Process for the purification of hydrogen by cryogenic treatment of a gas containing also nitrogen oxides and unsaturated hydrocarbons, said nitrogen oxides and unsaturated hydrocarbons comprising respectively two types of constituents which react together in an undesirable fashion when cooling achieves an intermediate temperature higher than the low temperature of the treatment, the process comprising
    cooling the gas to a first temperature higher than said intermediate temperature;
    eliminating from the gas one of said two types of constituents at said first temperature; and
    continuing the cooling of the gas to said low temperature.

2. Process according to claim 1, wherein said elimination is effected by washing the gas with a liquid adapted to dissolve one of said two types of constituents.

3. Process according to claim 2, wherein said liquid contains at least one saturated hydrocarbon.

4. Process according to claim 2, wherein said liquid is obtained by a partial condensation of an auxiliary gas which contains at least one of hydrogen and a heavy constituent whose value can be increased.

5. Process according to claim 4, wherein the gas treated is a residual gas from catalytic cracking in a fluidized bed (FCC) and the auxiliary gas is a hydrotreatment purge gas.

6. Apparatus for the purification of hydrogen by cryogenic treatment of a gas containing also two types of constituents, one of said two types comprising nitrogen oxides and the other of said two types comprising unsaturated hydrocarbons, which two types react together in an undesirable fashion when the cooling achieves an intermediate temperature higher than the low temperature of the treatment, the apparatus comprising
    means (3, 4) to cool the gas to a first temperature higher than said intermediate temperature;
    means (6) to eliminate from the gas one of said two types of constituents at said first temperature; and
    means (5) to continue the cooling of the gas to said low temperature.

7. Apparatus according to claim 6, adapted for the production of hydrogen and liquid petroleum gas (LPG) from a gas containing, in addition to said two types of constituents, nitrogen, methane and ethane, wherein the apparatus comprises:
    means (3, 4) to cool the gas with intermediate separation (at 8) of the heaviest constituents, to an intermediate temperature higher than −100° C.;
    means (3, 4) to cool to said intermediate temperature an auxiliary gas containing hydrogen and constituents of the LPG but stripped of unsaturated hydrocarbons, so as to obtain a condensate and a vapor phase (in 9);
    a column (6) for washing the treated gas by this condensate;
    means (5) to continue the cooling of the head vapor from the washing column (6); and
    a demethanization-deethanization column (7) fed by the liquid from the bottom of the washing column (6) and by the condensate of said intermediate separation (8), this latter column (7) producing at its base LPG.

* * * * *